Dec. 11, 1934.    P. J. BOWMAN ET AL    1,983,655
PITMAN CONNECTION
Filed May 13, 1929    2 Sheets-Sheet 1
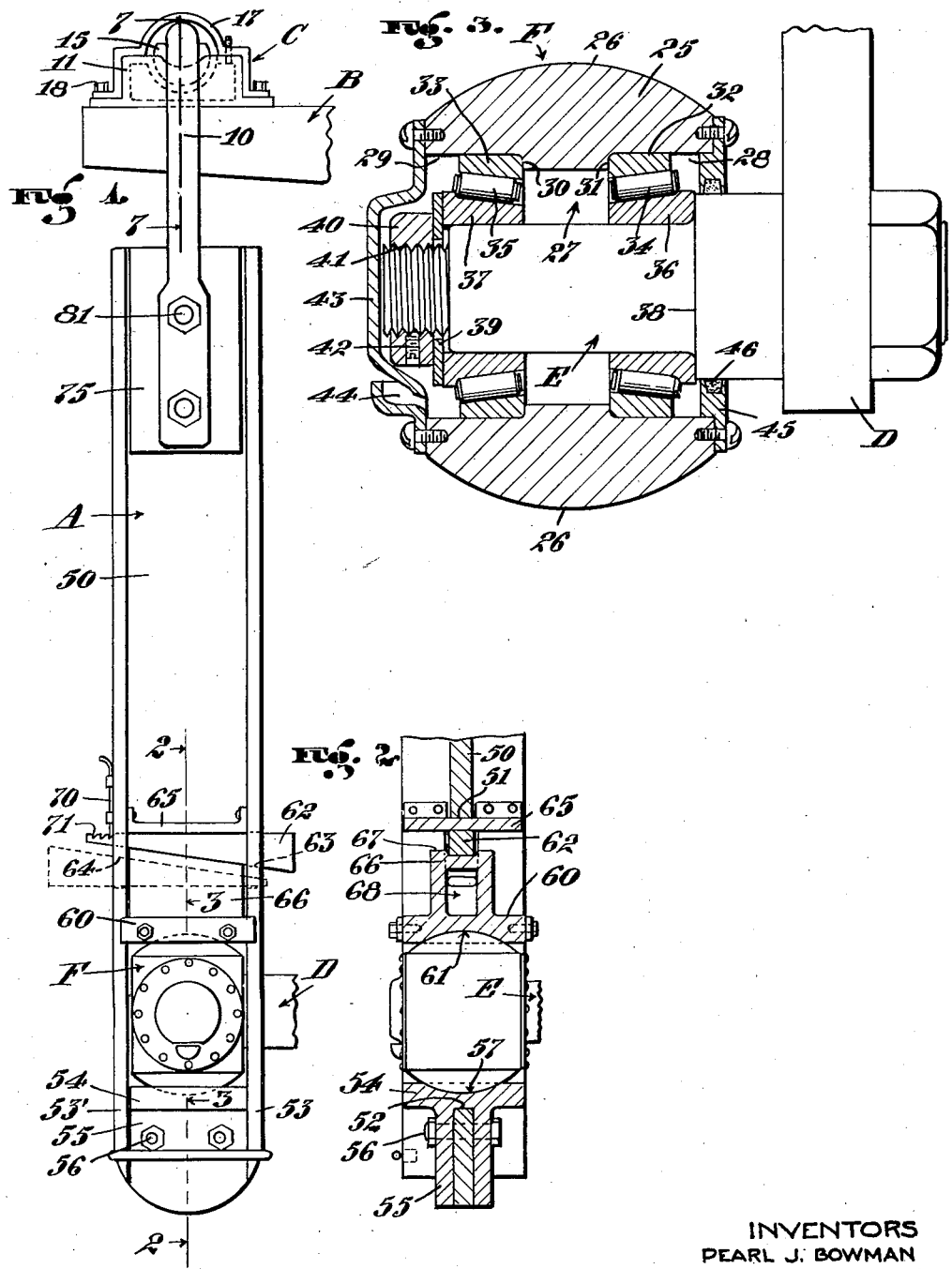
INVENTORS
PEARL J. BOWMAN
WILLIAM F. BOWMAN
BY R. S. Berry
ATTORNEY Dec. 11, 1934.   P. J. BOWMAN ET AL   1,983,655
PITMAN CONNECTION
Filed May 13, 1929   2 Sheets-Sheet 2
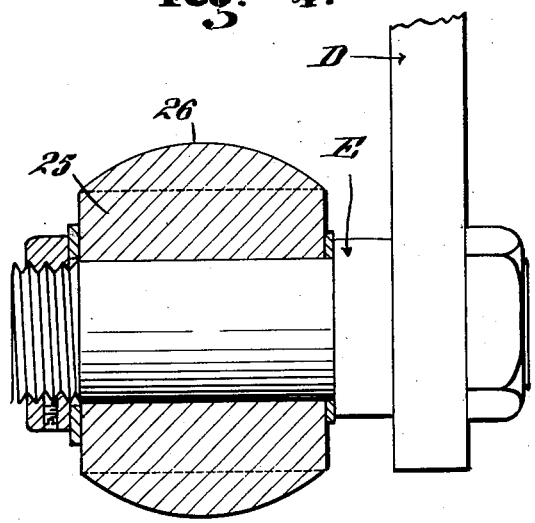
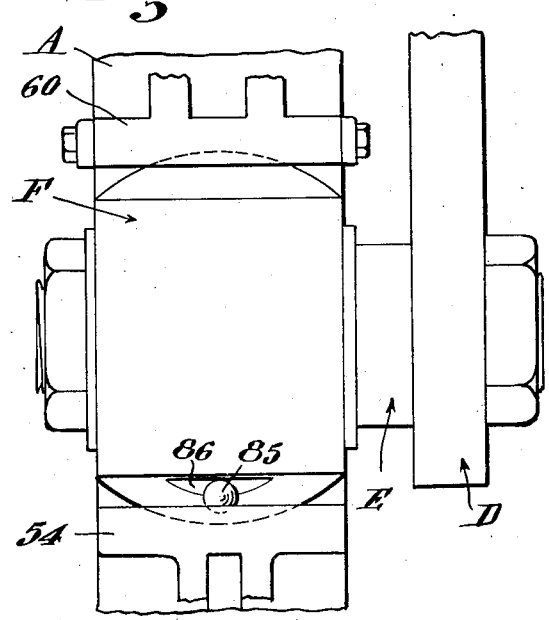
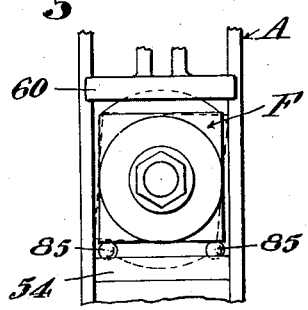
INVENTORS
PEARL J. BOWMAN
WILLIAM F. BOWMAN
BY
ATTORNEY.

Patented Dec. 11, 1934

1,983,655

UNITED STATES PATENT OFFICE 1,983,655

PITMAN CONNECTION

Pearl J. Bowman, Bell, and William F. Bowman, Ocean Park, Calif.

Application May 13, 1929, Serial No. 362,508

12 Claims. (Cl. 287—93)

This invention relates to a pitman connection and deals particularly with pitmans such as are employed on oil well rigs.

The present application is filed as a copending application with our former application, Serial No. 261,641, filed March 14, 1928.

An object of this invention is to provide a pitman having a universal connection between the pitman and the journal box for the wrist pin.

Another object is to provide a journal box constructed of a single piece, wherein the wrist pin may be journalled and held in such a manner as to prevent its withdrawal.

Another object is to provide a journal box and a wrist pin adapted to be journalled therein, wherein roller bearings or ball bearings may be incorporated in place of friction bearings. Because of the heavy duty work that pitman connections of this type are called upon to perform, it becomes highly essential that friction losses be reduced wherever possible. Consequently, a pitman with a wrist pin journal box having roller or ball bearings is contemplated.

Another object is to provide a journal box that is substantially dust and grit proof and consequently will not leak oil, thus effecting a saving in lubricant and the time spent in lubricating.

Another object is to eliminate the usual fire hazard around an oil well rig, which result is accomplished by providing all bearing parts on the pitman and walking beam with oil seals thus preventing any oil overflowing and accumulating that ordinarily creates such a hazard.

Another object is to utilize an ordinary I beam with special adaptation for the pitman connection.

Another object is to utilize the same means that holds the bearing caps in position for releasing and removing said caps.

Another object is to provide a journal box formed to constitute a universal bearing between a pitman rod and a wrist pin which is so mounted on the wrist pin and so connected to the pitman that the pitman may be detached from the journal box without removing the latter from the wrist pin so that the journal box may remain mounted on the wrist pin when the pitman rod is disconnected therefrom.

A further object is to provide a construction whereby the journal box will be held on the wrist pin against rotation thereon relatively to the pitman.

The foregoing objects and advantages together with any subsequent features that may be developed in the specification and claims constitute our invention which is shown anu illustrated in the accompanying drawings, in which:

Fig. 1 is a view in front elevation of our pitman completely assembled;

Fig. 2 is a section on line 2—2 of Fig. 1;

Fig. 3 is an enlarged section on line 3—3 of Fig. 1;

Fig. 4 shows a modified form of journal box wherein the roller bearings are omitted;

Fig. 5 shows a modified form of a wrist pin journal box having means for maintaining the journal box in a true upright position;

Fig. 6 shows another view at right angles of the modified form shown in Fig. 5.

Referring to the drawings and particularly to Fig. 1, wherein our pitman assembly is shown consisting of a pitman rod A, a walking beam B, a journal box C on said walking beam, a crank arm D having a wrist pin E mounted thereon, and a journal box F mounted on said wrist pin. The pitman rod A is here shown as formed of I-beam which includes a web 50.

The pitman A is provided with a stirrup member 10, suitably attached thereto at the upper end, as shown at 81, which stirrup passes over the walking beam B and is journalled in the box C. The journal box C affords a bearing for a rocker 15 on which the stirrup 10 seats and includes a lower casing member 11 and a cover casing 17 which latter is held in place by bolts 18, and which bolts also serve to hold the lower casing 11 attached to the walking beam.

In this instance, while the pitman rod is shown comprising an I beam, we do not confine ourselves to this particular type of pitman rod as we are aware that beams of other sections and other materials may be used with results equally advantageous. However, since the I beam lends itself readily to our purposes, it will be used in the description.

The journal box F which is adapted to journal the wrist pin E and also effect a universal connection between said wrist pin and the pitman A, consists of a single block of metal 25 having diametrically opposed hemispherical domes 26 on the upper and lower margins thereof. The opposite side margins of the block are formed with flat faces 12 which extend in parallel relation to each other. The center of the block 25 is formed with an opening 27 and each end of the opening 27 is counter bored as shown at 28 and 29 thus forming annular shoulders 30 and 31. Bearing against the annular shoulders 30 and 31 are roller bearing races 32 and 33 respectively adapted to receive rollers 34 and 35. It is obvious that balls may be substituted for rollers by changing the shape of the outer and inner races. The inner races 36 and 37 are mounted on the wrist pin E; the inner race 36 abutting against the annular shoulder 38 and the other inner race 37 being forced and held on the pin E by means of a washer 39 which bears against the outer edge of the race 37 and is held thereagainst by a nut 40 which is screw threaded onto the end of the wrist pin E as shown at 41. The arrangement thus provided wherein tapered roller bearings are used, affords a roller bearing, for radial and thrust forces.

As a means of locking the nut 40 to the pin E, a conventional set screw 42 may be used or any other suitable means may be utilized.

The outer end of the block 25 is closed by a cover plate 43 which is provided with oil feed opening 44. As shown, the opening 44 is positioned below the protruding portion of the cover that houses the nut 40 and consequently is well protected against dust and water. If found desirable, it may also be provided with a protecting cover. The purpose of placing the oil feed at the lower side of the bearing is to control the oil level and prevent the operator from putting too much oil in the bearing. The opening 28 in the rear end of the block 25 is fitted with a cover plate 45 suitably attached thereto and provided with a conventional oil seal gasket 46.

The wrist pin E is suitably mounted upon the crank arm D in the conventional manner as shown.

In mounting our bearing in the pitman rod A, the journal box F is mounted upon the wrist pin E intact. The I beam of the pitman A is formed with a sequent of the web 50 cut away between the points 51 and 52 with the flanges 53 and 53' left intact. Over the lower portion 52 of the web 50, a socket cap 54 having a bifurcated depending portion 55 is adapted to seat and be attached thereto as shown at 56. This provides a rigid mounting for the socket cap 54 which is equipped on the upper flat surface with a hemispherical concavity 57 adapted to receive the lower dome 26 of the journal box F and form a universal connection therebetween.

The upper end of the journal box F is held by another socket cap 60 which is also provided with a hemispherical concavity 61 adapted to receive the upper dome 26 of the box F, and form the other half of the universal connection. The means for holding the cap 60 in place comprise a wedge 62 adapted to pass through openings 63 and 64 in the flanges 53 and 53', respectively, and bearing against the plate 65 suitably fixed across the end of the web 50. The other side of the wedge 62 bears against an upstanding member 66 which is an integral part of the cap 60. Small upstanding flanges 67 on both sides of the wedge form a guideway which serves to properly align the cap 60 and the wedge 62.

As a means of raising the cap 60 and releasing the journal box F for removal of the pitman rod A, we have made the upstanding member 66 with an internal passage 68 adapted to receive the wedge 62. It is thus obvious that by reversing the wedge as shown in dotted lines on Fig. 1, the cap may be raised and the pitman removed from the journal box F and thus leaving the latter intact on the wrist pin.

In order to prevent the wedge sliding out of wedging position when holding the journal box F during operation, we have provided a plunger 70 mounted on the flange 53' of the pitman A adapted to engage the teeth 71 provided on the upper edge of the wedge 62.

In Fig. 4, we have shown a form of journal box having no rollers. This type of box is cheaply constructed and may be advantageously employed where heavy duty work is not required.

In Fig. 5, a means of preventing the journal box from following the urge of the wrist pin to rotate and cock itself in the opening in the pitman rod is shown. The means in this instance, comprise two balls 85 located on the center line of the journal box F in a plane parallel to the line of rotation of the wrist pin E. The balls 85 are socketed in the lower cap 54 and travel in grooves 86 cut in the lower dome of the journal box F. This arrangement permits the journal box to follow the urge of the wrist pin in every direction but the one of rotation. We make this arrangement optional since it obviously could not be used on all occasions.

In the operation of the invention rotation of the crank D will effect turning of the wrist pin E within the journal box or bearing F and will effect a combined lateral oscillating and vertically reciprocal movement of the pitman rod A resulting in rocking of the walking beam B in the usual manner, but by provision of the hemispherical domes 26 on the upper and lower faces of the journal box and their associated sockets 61 and 57 carried by the walking beam, the latter may also oscillate on a plane in the direction of the length of the wrist pin and may also pivot on its longitudinal axis relatively to the journal box thus allowing the pitman to accommodate itself to inaccuracies of alignment and without subjecting the wrist pin and the journal box to strains due to such misalignment. To permit this relative movement of the pitman and journal box the convex surfaces of the hemispherical domes 26 are formed to conform to a common sphere, or in other words the arches thereof are formed on corresponding arcs the radii of which are struck from a common center lying on the axis of the wrist pin.

An important feature of the invention resides in the mounting of the journal box on the wrist pin independent of the pitman, in providing the journal with flat sides, in forming the pitman with an opening to receive the journal box in the direction of the length of the latter having flat side walls arranged to extend along the flat sides of the journal, together with the socket bearings affording opposed seats for the journal box one of which is movable relative to the other, since by this construction the pitman may be readily detached from the wrist pin without disturbing the journal box, it only being necessary to shift the socket cap 60 on the pitman to free the journal box and thus permit the pitman being swung outwardly in the direction of the length of the wrist pin clear of the journal box. In other words, all that is required in order to effect disengagement of the pitman from the wrist pin is to elevate the socket cap 60, lift the journal box out of its lower seat, and pull the pitman straight out and likewise in effecting connection between the pitman and wrist pin is to slide the pitman inwardly over the journal box to position the socket members opposite the domes on the latter, then move the crank to dispose the lower dome in the socket 57, and finally advance the cap 60 to seat the upper dome in the socket 61. This relative movement of the pitman and journal box is attainable by reason of the latter being attached to and carried solely by the wrist pin and being shaped with the flat sides in conjunction with the flat sided opening in the pitman of a greater length than the height of the journal box so that the journal box may be moved longitudinally of the pitman to engage or disengage it from its lower seat.

We claim:

1. The combination of a wrist pin, a bearing block assembled on and carried by said wrist pin in which said wrist pin is journaled, diametrically opposed hemispherical domes spaced apart on said block, a pitman having an opening to receive said block, a pair of spaced socket caps carried by said pitman in which said domes slidably seat; one of said socket caps being carried on the end portion of said pitman and the other of said socket caps being detachably mounted in the opening in said pitman, and wedge means for holding said last-named socket cap in a seated position on said dome, said block being adapted while carried on said pin to be passed in and out of said opening in the direction of the length of said pin and transversely of said pitman.

2. The combination of a wrist pin, a bearing block assembled on and carried by said wrist pin in which said wrist pin is journaled, diametrically opposed hemispherical domes spaced apart on said block, a pitman having an opening to receive said block, a pair of spaced socket caps carried by said pitman in which said domes slidably seat; one of said socket caps being carried on the end portion of said pitman and the other of said socket caps being detachably mounted in the opening in said pitman, an inclined plane on said last-named socket cap, and a wedge slidably mounted on said pitman and arranged to extend longitudinally of said inclined plane and operable to cooperate therewith to hold the socket cap in a seated position on said block, said block being adapted while carried on said pin to be passed in and out of said opening in the direction of the length of said pin and transversely of said pitman.

3. The combination of a wrist pin, a bearing block assembled on and carried by said wrist pin in which said wrist pin is journaled, diametrically opposed hemispherical domes spaced apart on said block, a pitman having an opening to receive said block, a pair of spaced socket caps carried by said pitman in which said domes slidably seat; one of said socket caps being carried on the end portion of said pitman and the other of said socket caps being detachably mounted in the opening in said pitman, an inclined plane on said last-named socket cap, a wedge slidably mounted on said pitman and arranged to extend longitudinally of said inclined plane and operable to cooperate therewith to hold the socket cap in a seated position on said block and detachable means for holding said wedge against displacement, said block being adapted while carried on said pin to be passed in and out of said opening in the direction of the length of said pin and transversely of said pitman.

4. The combination of a wrist pin, a bearing block in which said wrist pin is journaled, diametrically opposed hemispherical domes on said block, a pitman having an opening to receive said block, a pair of socket caps carried by said pitman in which said domes slidably seat; one of said socket caps being carried on the end portion of said pitman and the other of said socket caps being detachably mounted in the opening in said pitman, an inclined plane on said last-named socket cap, a wedge slidably mounted on said pitman and arranged to extend longitudinally of said inclined plane and operable to cooperate therewith to hold the socket cap in a seated position on said block and means whereby said wedge may be engaged with said movable socket cap and operated to effect movement of the latter out of engagement with said block.

5. The combination of a wrist pin, a block bearing on said wrist pin having opposed hemispherical domes on its upper and lower margins, a pitman having an opening to receive said block, a pair of socket caps carried by said pitman in which the domes of said block are slidably seated to permit turning of said pitman on said block on the longitudinal axis of the pitman and allow the pitman to oscillate relatively to the block and a pair of ball-bearings interposed between one of said socket caps and said block and spaced apart on opposite sides of the vertical center of said block to prevent rocking movement of the block between said socket caps in one direction.

6. A pitman and wrist pin connection comprising in association with a pitman and a wrist pin a journal box adapted to receive the wrist pin and to be carried thereon independent of said pitman, said journal box having formed on its upper and lower margins a hemispherical arch, said arches being spaced apart and formed on arcs the radii of which are struck from a common center lying on the axis of a wrist pin on which the journal box is carried, a pair of spaced relatively movable sockets carried on the pitman in which said hemispherical arches slidably seat, means for fastening said sockets against relative movement and means for holding said journal box against rotation relatively to the pitman in the direction of the circumference of the wrist pin yet permit limited movement therebetween, said journal box being adapted to be disposed in and out of position between said sockets by moving said pitman transversely in the direction of the length of said wrist pin.

7. A pitman and wrist pin connection comprising a wrist pin, a pitman, a journal box mounted on and carried solely by said wrist pin and independent of said pitman, external bearing members on only the upper and lower sides of said journal box, said pitman being formed with an opening into which said journal box is disposed, said opening and journal box being formed to permit said pitman being advanced laterally in the direction of the length of said wrist pin to place said journal box in or out of said opening, a bearing on the lower end of said pitman on which the lower bearing member on said journal box is seated, a bearing carried on said pitman above said journal box affording a seat for the upper bearing on the latter, said bearings being adapted to permit relative transverse swinging movement of said journal box and pitman, and means for adjusting at least one of said bearings to free said journal box.

8. A pitman and wrist pin connection comprising in association with a pitman and a wrist pin, a journal box adapted to receive the wrist pin, said journal box having opposed parallel flat faces, said pitman having an end portion in which said journal box is mounted, said end portion including walls arranged to cooperate with said flat faces to limit turning movement of said journal box relatively to said pitman in the direction of the circumference of the wrist pin, a pair of spaced bearings carried by said pitman one of which is movable relative to the other toward or away from said journal box, opposed dome like bearing members on said journal box adapted to seat on said bearings, means carried by said pitman for holding said journal box with said dome like bearing members slidably supported between said bearings, and means for holding said journal box in place on said wrist pin independent of said pitman; said pitman being movable longitudinally of said wrist pin independent of said journal box on poistioning said bearings in spaced relation to said domes.

9. In a pitman and wrist pin connection, a pitman, a wrist pin, a bearing block assembled on and carried by said wrist pin in relation to which said wrist pin is turnable, said bearing block being mounted on said pin independent of said pitman, detachable means for holding said bearing block on said wrist pin against movement longitudinally thereof, spaced bearings carried by said pitman between which said bearing block is interposed, said bearings engaging upper and lower portions of said bearing block at spaced points and adapted to permit limited universal movement between said pitman and bearing block; at least one of said bearings being adjustable in the general direction of the length of said pitman for disengagement from said bearing block, and means for holding said adjustable bearing in engagement with said bearing block.

10. In a pitman and wrist pin connection, a bearing block, outwardly curved bearing members formed on the upper and lower sides of said bearing block, a wrist pin journalled in said bearing block, means for holding said bearing block against movement longitudinally of said wrist pin, a pitman, spaced bearing members on said pitman between which said bearing block is interposed and coacting with the bearing members on the latter to form a universal joint between the pitman and bearing block, said bearing block having flat side walls, said pitman having wall portions extending in spaced relation to the flat side walls of the bearing block and coacting therewith to permit yet limit turning of said bearing block relative to said pitman circumferentially of said wrist pin.

11. The combination of a wrist pin, a pitman having an opening for the reception of a bearing block, a bearing block, means for holding the bearing block in assembled relation on the wrist pin independent of the pitman, the bearing block having diametrically opposed domes having the shape of a segment of a sphere and spaced apart on the bearing block, a pair of spaced bearing caps carried by the pitman and in which the domes are slidably mounted, the bearing caps being relatively movable toward and away from each other in the direction of the longitudinal axis of the pitman whereby the bearing block while carried on the wrist pin may be passed in and out of the opening in the pitman in the direction of the wrist pin and transversely of the pitman.

12. The combination of a wrist pin, a pitman having an opening for the reception of a bearing block, a bearing block in which the wrist pin is journaled, means for holding the bearing block in assembled relation on the wrist pin independent of the pitman, the bearing block having diametrically opposed domes having the shape of a segment of a sphere and spaced apart on the bearing block, a pair of spaced bearing caps carried by the pitman and in which the domes are slidably mounted, the bearing caps being relatively movable toward and away from each other in the direction of the longitudinal axis of the pitman whereby the bearing block while carried on the wrist pin may be passed in and out of the opening in the pitman in the direction of the wrist pin and transversely of the pitman.

PEARL J. BOWMAN.
WILLIAM F. BOWMAN.